US012775898B2

(12) United States Patent
Jain

(10) Patent No.: US 12,775,898 B2
(45) Date of Patent: Oct. 27, 2026

(54) SYSTEMS AND METHODS FOR AUTOMATED EVALUATION OF DIGITAL SERVICES

(71) Applicant: Sling TV L.L.C., Englewood, CO (US)

(72) Inventor: Vikal Kumar Jain, Foster City, CA (US)

(73) Assignee: SLING TV L.L.C., Englewood, CO (US)

( * ) Notice: Subject to any disclaimer, the term of this patent is extended or adjusted under 35 U.S.C. 154(b) by 0 days.

(21) Appl. No.: 18/148,307

(22) Filed: Dec. 29, 2022

(65) Prior Publication Data

US 2023/0140605 A1 May 4, 2023

Related U.S. Application Data

(63) Continuation of application No. 17/129,273, filed on Dec. 21, 2020, now Pat. No. 11,574,273.

(51) Int. Cl.
*G06Q 10/0639* (2023.01)

(52) U.S. Cl.
CPC ................ *G06Q 10/06393* (2013.01); *G06Q 10/06395* (2013.01)

(58) Field of Classification Search
None
See application file for complete search history.

(56) References Cited

U.S. PATENT DOCUMENTS 7,659,897 B1 * 2/2010 Azar ........................ G09G 5/00 702/182
10,313,211 B1 6/2019 Rastogi et al.
(Continued)

FOREIGN PATENT DOCUMENTS

EP 2654225 A2 * 10/2013 .......... G06F 11/3438
EP 3699766 A1 8/2020
(Continued)

OTHER PUBLICATIONS

Liu, Xiangkai, et al. "Subjective and objective video quality assessment of 3D synthesized views with texture/depth compression distortion." IEEE Transactions on Image Processing 24.12 (2015): 4847-4861. (Year: 2015).*
Baroncini, V., et al. "Diagnostic quality monitoring of video sequences based on multiple structural analysis." coordinates 1.1 (2009): 1. (Year: 2009).*
(Continued)

*Primary Examiner* — Thomas L Mansfield
(74) *Attorney, Agent, or Firm* — Seed Intellectual Property Law Group LLP

(57) ABSTRACT

A digital service evaluation system evaluates services and user sessions provided by a service, to provide an overall score of the service. The digital service evaluation system detects client sessions associated with one or more devices. The digital service evaluation system obtains a first plurality of scores associated with performance metrics of the client session, and calculates an overall score for the client session. The digital service evaluation system obtains a second plurality of scores and calculates a second overall score. The digital service evaluation system determines a weight for each performance metric based on the first and second plurality of scores and the overall scores. The digital service evaluation system uses the weights to determine which performance metric caused a change in the overall scores. The digital service evaluation system takes an action based on the determination that a performance metric caused a change in the overall scores.

20 Claims, 10 Drawing Sheets

(56) References Cited

U.S. PATENT DOCUMENTS

| | | | | | |
|---|---|---|---|---|---|
| 11,212,531 | B2 * | 12/2021 | Mayer-Patel | H04N 19/146 | |
| 11,361,416 | B2 * | 6/2022 | Bampis | G06F 18/214 | |
| 2006/0090010 | A1 * | 4/2006 | Qin | H04N 17/004 | 710/53 |
| 2008/0016412 | A1 * | 1/2008 | White | H04L 41/0631 | 714/48 |
| 2008/0122971 | A1 | 5/2008 | Xie | | |
| 2010/0135417 | A1 * | 6/2010 | Hargil | H04N 19/117 | 375/240.01 |
| 2013/0157708 | A1 * | 6/2013 | Economy | H04W 48/18 | 455/518 |
| 2015/0019707 | A1 * | 1/2015 | Raghunathan | H04L 43/08 | 709/224 |
| 2016/0147583 | A1 * | 5/2016 | Ben Simhon | G06F 11/0721 | 714/47.3 |
| 2017/0357719 | A1 * | 12/2017 | Cudrigh | G06F 16/285 | |
| 2018/0300869 | A1 * | 10/2018 | Aaron | H04N 19/154 | |
| 2019/0188121 | A1 * | 6/2019 | Simon | G06Q 20/0855 | |
| 2019/0281324 | A1 * | 9/2019 | Turmel | H04L 65/80 | |
| 2019/0295242 | A1 * | 9/2019 | Bampis | G06V 10/774 | |
| 2019/0306044 | A1 * | 10/2019 | Cohen | H04L 67/535 | |
| 2020/0029093 | A1 * | 1/2020 | Zhou | H04N 19/96 | |
| 2020/0269133 | A1 * | 8/2020 | Sun | H04N 19/70 | |
| 2020/0366747 | A1 | 11/2020 | Bordia et al. | | |

FOREIGN PATENT DOCUMENTS

| | | | | | |
|---|---|---|---|---|---|
| JP | 2015517260 | A * | 6/2015 | H04L 41/5009 |
| WO | WO-2015031982 | A1 * | 3/2015 | G06K 9/00711 |
| WO | WO-2017176656 | A1 * | 10/2017 | G06K 9/00718 |
| WO | WO-2018165694 | A1 * | 9/2018 | H04N 19/64 |
| WO | WO-2018206551 | A1 * | 11/2018 | A01C 3/023 |
| WO | WO-2021137856 | A1 * | 7/2021 | G06N 3/0454 |

OTHER PUBLICATIONS

Usman, Muhammad Arslan, and Maria G. Martini. "On the suitability of vmaf for quality assessment of medical videos: Medical ultrasound & wireless capsule endoscopy." Computers in biology and medicine 113 (2019): 103383. (Year: 2019).*

Dobrian, Florin, et al. "Understanding the impact of video quality on user engagement." ACM SIGCOMM computer communication review 41.4 (2011): 362-373. (Year: 2011).*

Yamagishi, Kazuhisa. "QoE-estimation models for video streaming services." 2017 Asia-Pacific Signal and Information Processing Association Annual Summit and Conference (APSIPA ASC). IEEE, 2017. (Year: 2017).*

Kazemi, Mohammad, Mohammad Ghanbari, and Shervin Shirmohammadi. "The performance of quality metrics in assessing error-concealed video quality." IEEE Transactions on Image Processing 29 (2020): 5937-5952. (Year: 2020).*

Aafaq et al., "Video Description: A Survey of Methods, Datasets, and Evaluation Metrics," *ACM Computing Surveys 52*(6):1-37, Oct. 2019.

Brunnstrom et al., "VQEG Validation and ITU Standardization of Objective Perceptual Video Quality Metrics [Standards in a Nutshell]," *IEEE Signal Processing Magazine 26*(3): 96-101, May 2009.

Chikkerur et al., "Objective Video Quality Assessment Methods: A Classification, Review, and Performance Comparison," *IEEE Transactions on Broadcasting 57*(2): 165-182, Jun. 2011.

International Search Report, mailed Mar. 17, 2022, for International Application No. PCT/US2021/063607. (15 pages).

Moldovan et al., "VQAMap: A Novel Mechanism for Mapping Objective Video Quality Metrics to Subjective MOS Scale," *IEEE Transactions on Broadcasting 62*(3):610-627, Sep. 2016.

Yilmaz, Gokce Nur, "A Depth Perception Evaluation Metric for Immersive 3D Video Services," *2017 3DTV Conference: The True Vision-Capture, Transmission and Display of 3D Video* (*3DTV-CON*), Copenhagen, Denmark, Jun. 7-9, 2017.

Communication pursuant to Article 94(3) EPC for EP Application No. 21 843 838.0, dated Aug. 7, 2024, 7 pages.

* cited by examiner

| Client Session ID | Customer ID | Number of Video Sessions | App Startup Time (ms) | Video Session Crashed | User Score | Client session score | |
|---|---|---|---|---|---|---|---|
| 1111 | 123 | 5 | 15 ms | 1 | 3/5 | 7 | 501 |
| 2222 | 123 | 2 | 12 ms | 0 | 5/5 | 9 | 502 |
| 3333 | 223 | 3 | 5000 ms | 3 | 1/5 | 4 | 503 |
| ⋮ | ⋮ | ⋮ | ⋮ | ⋮ | ⋮ | ⋮ | |
| 510 | 511 | 512 | 513 | 514 | 515 | 516 | |

FIG. 5

SYSTEMS AND METHODS FOR AUTOMATED EVALUATION OF DIGITAL SERVICES

BRIEF SUMMARY

Consumers subscribe to a multitude of services, such as video streaming services, music streaming services, financial services, etc., accessible through their devices. As developers make changes to these services, the consumer's experience with the service may change. However, developers do not have adequate tools to determine the overall impact of the changes they have made to a service, nor do they have adequate tools to determine an overall score to rate the service. Additionally, they do not have adequate tools to determine which changes they made caused a greater change in the overall score than others.

The embodiments disclosed herein address the issues above and thus help solve the above technical problems and improve the technology of automated service evaluation of digital services by providing a technical solution that collects data from a multitude of devices using digital services to assign an overall score to the digital service. Additionally, the embodiments disclosed herein are further able to identify performance metrics relating to parts of the service, such as startup time, buffering time, crash rate, user satisfaction, etc. These performance metrics can be used to determine which parts of the service caused a change in the overall score, as well as the magnitude of that change. In some embodiments, the system to evaluate services obtains data related to a plurality of client sessions, including scores related to performance metrics, and uses that data to determine an overall score and a weight of each performance metric. In some embodiments, the system to evaluate services receives performance data, including performance metrics of the service, and transmits an indication of an action to take to a client device based on the performance metrics and a calculated overall score. In some embodiments, the system to evaluate services includes a service evaluation data structure which can be used to calculate an overall score and determine which performance metric caused a change in the overall score.

BRIEF DESCRIPTION OF THE SEVERAL VIEWS OF THE DRAWINGS

FIG. 5 is a table diagram representing a service evaluation data structure, according to various embodiments described herein.

DETAILED DESCRIPTION

Figure 1:
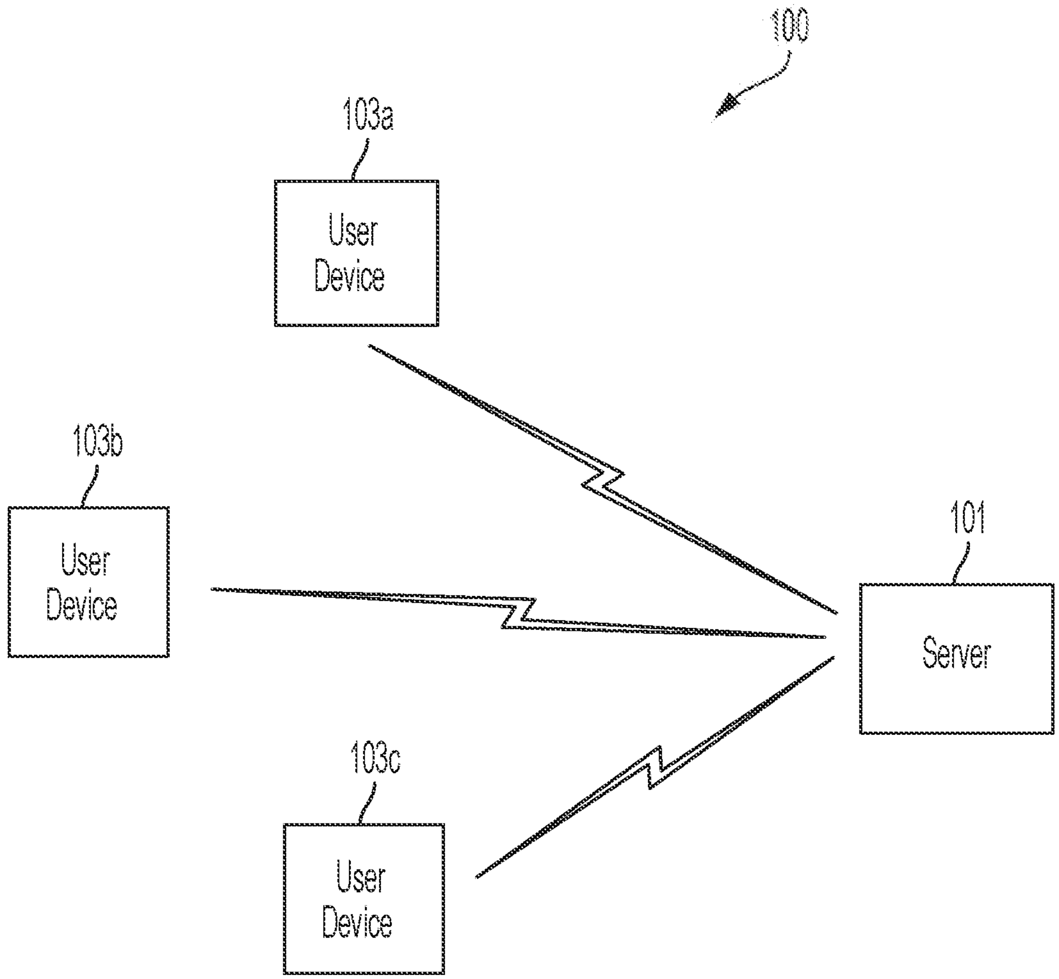
FIG. 1 is a diagram depicting an example digital service evaluation system according to various embodiments described herein.

Developers are generally unable to determine the impact of changes and adjustments made to a service. This impact could include user satisfaction, performance of the service on certain devices, user retention, growing the user-base, etc. Additionally, a comparison of the impact of changes is difficult to perform because developers lack an overall score to use as a reference point when comparing changes in the service over time. Furthermore, it is difficult to compare the service to other services, like those provided by the same service provider, similar services from other service providers, etc., without an overall score calculated based on the performance metrics of a service.

The embodiments disclosed herein address the issues above and help solve the above technical problems and improve the evaluation of services by providing a technical solution that obtains performance data describing the performance of a service and calculates an overall score based on that performance data. The system to evaluate services (or "digital service evaluation system") additionally uses the performance data to determine which performance metrics, of a plurality of performance metrics used to determine the overall score, caused the greatest changes to the overall score over time. In some embodiments, a digital service evaluation system electronically detects a plurality of client sessions associated with one or more devices and obtains a first plurality of scores each describing one or more performance metrics of the client session and uses the scores to determine a first overall score of the service. The digital service evaluation system receives a second plurality of scores associated with the client session and uses the second plurality of scores to determine a second overall score of the service. The digital service evaluation system then determines a weight for each performance metric based on the first overall score, second overall score, first plurality of scores, and second plurality of scores. The digital service evaluation system uses the weight of each performance metric to determine which performance metric caused a change between the first overall score and second overall score, and takes an action to change the performance metric such that the overall score increases. The digital service evaluation system is thus able to evaluate a service based on a large number of client sessions to give an accurate score describing the overall performance of the service.

In some embodiments, the performance metrics include data related to a user's experience, such as user engagement, churn rate, user satisfaction, desire to recommend the service, etc. The performance metrics related to a user's experience may be part of a net promoter score (a score describing the likelihood of a user to recommend, or promote, a service). The performance metrics may include scores related to the functioning of the service, such as time spent on the service, quality of the content (such as video quality, audio quality, etc.), the crash rate, the number of client sessions within a certain time period, etc. In some embodiments, the digital service evaluation system obtains the data making up the performance metrics from log files generated by the service. The digital service evaluation system may obtain the data making up the performance metrics from crash reports. The digital service evaluation system may obtain the data making up the performance metrics from user input. The digital service evaluation system may utilize a survey presented to a user to obtain data for the performance metrics.

In some embodiments, the digital service evaluation system uses the performance metrics to obtain an overall score for the service. The digital service evaluation system may use the performance metrics to obtain a score for a specific portion of a service. The digital service evaluation system may use the performance metrics to obtain a score for individual client sessions. The digital service evaluation system may use the performance metrics to obtain a score for specific devices, or groups of devices, associated with a user.

In some embodiments, one or more of the performance metrics are classified as a prioritized performance metric. The digital service evaluation system may alter the weight of a performance metric based on a determination that it is a prioritized performance metric. The digital service evaluation system may obtain user input indicating that a performance metric should be prioritized. The digital service evaluation system may utilize the prioritized performance metrics to create a customized score for a specific user, device, group of devices, etc.

In some embodiments, the client session may include one or more other sessions, such as a video session, an audio session, a game session, etc. (collectively "sub-sessions"). The digital service evaluation system may obtain performance metrics from each sub-session within a client session. The digital service evaluation system may determine an overall score for the sub-sessions based on the obtained performance metrics from each sub-session.

In some embodiments, the digital service evaluation system obtains data specifying a device type of a device receiving the client session. The digital service evaluation system may use the device type to determine an overall score for client sessions related to specific devices. The digital service evaluation system may obtain data specifying a type of service associated with a client session. The digital service evaluation system may use the service type to determine an overall score for a specific service. The digital service evaluation system may compare the overall score for a specific service to the overall score of another service. The overall score may be a linear score. The overall score may be a matrix score, such that the overall score reflects a score for two or more parameters.

In some embodiments, the digital service evaluation system takes an action after determining that a performance metric caused a change in the overall score. The action may include alerting a developer that the performance metric caused a change in the overall score. The action may include a message to a user of a device which received a client session. The digital service evaluation system may request information from a user to determine why the performance metric changed the overall score. The action may include comparing overall scores for the service related to different devices. The action may include comparing overall scores for different services.

In some embodiments, the digital service evaluation system transmits a client session indicating a digital video to a device. The device may obtain performance data describing performance metrics of the client session. The digital service evaluation system may obtain the performance data from the device. The digital service evaluation system may use the performance data to determine whether there was a change in the overall performance of the client session. The digital service evaluation system may transmit an indication of an action to take to the device based on the determination of whether there was a change in the overall performance of the client session.

In some embodiments, the digital service evaluation system includes a service evaluation data structure. The service evaluation data structure may be used to determine an overall performance metric of a client session. The service evaluation data structure may be used to determine whether one or more performance metrics caused a change in the overall performance metric of the client session. The service evaluation data structure may include information specifying a client session of a plurality of client sessions. The service evaluation data structure may include information specifying a digital video associated with the client session. The service evaluation data structure may include information specifying one or more scores representing performance metrics of the client session and an overall score based on the scores representing the performance metrics. The service evaluation data structure may include information specifying a weight of each performance metric based on the scores representing performance metrics and the overall score.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

FIG. 1 is a diagram depicting an example digital service evaluation system 100 according to various embodiments described herein. It is to be appreciated that FIG. 1 illustrates just one example of a digital service evaluation system 100 and that various embodiments discussed herein are not limited to the use of such an environment. The example digital service evaluation system 100 includes a server 101 and one or more user devices 103*a*-103*c*. The digital service evaluation system 100 may include a variety of user devices 103*a*-103*c* which may be communicatively coupled to one or more servers 101 and/or to each other.

The user premises may also include an optional network, communication system, or networked system (not shown), to which the server 101, as well as user devices 103*a*-103*c* and other endpoint devices (not shown), may be coupled. Non-limiting examples of such a network or communication system include, but are not limited to, an Ethernet system, twisted pair Ethernet system, an intranet, a local area network ("LAN") system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more endpoint devices, such as PCs, tablets, laptop computers, smartphones, personal assistants, Internet connection devices, wireless LAN, WiFi, Worldwide Interoperability for Microwave Access ("WiMax") devices, or the like, may be communicatively coupled to the network and/or to each other so that the plurality of endpoint devices are communicatively coupled together. Thus, such a network enables the server 101, user devices 103*a*-103*c*, and any other interconnected endpoint devices, to communicate with each other.

The user devices 103*a*-103*c* may include devices such as cellular telephones, smartphones, tablets, personal computers, laptop computers, wireless peripheral devices such as headphones, microphones, mice, keyboards, etc., security cameras, Internet of Things (or "smart") devices, televisions, smart televisions, smart television devices—such as FireTV, Roku, AppleTV, etc., —routers, digital assistants, personal assistant devices—such as Amazon Alexa, Google Home, etc., —drones, etc. The user devices 103*a*-103*c* may interconnect to one or more communications media or sources, such as routers, network switches, modems, etc., to transmit communications to other devices. The user devices 103*a*-103*c* may transmit data representing performance metrics, data describing the user devices 103*a*-103*c*, etc., to the server 101.

The above description of the digital service evaluation system 100, and the various devices therein, is intended as a broad, non-limiting overview of an example environment in which various embodiments of a digital service evaluation system 100 can operate. The digital service evaluation system 100, and the various devices therein, may contain other devices, systems and/or media not specifically described herein.

Example embodiments described herein provide applications, tools, data structures and other support to implement systems and methods for evaluating services. The example embodiments described herein additionally provide applications, tools, data structures and other support to implement systems and methods for providing an overall score of a service, client session, sub-session, etc. Other embodiments of the described techniques may be used for other purposes, including for determining whether one or more performance metrics caused a change in the overall score and taking an action based on that determination. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
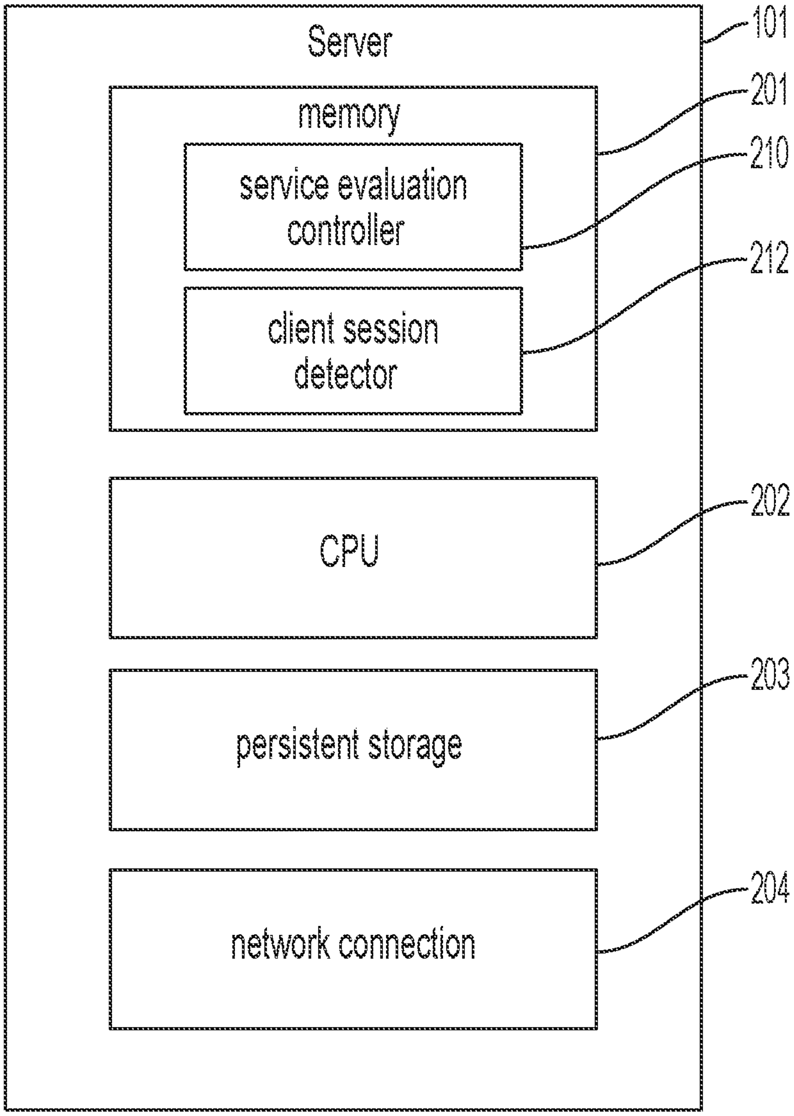
FIG. 2 is a block diagram depicting example components incorporated in a server on which the digital service evaluation system may operate, according to various embodiments described herein.

FIG. 2 is a block diagram depicting example components incorporated in a server 101 on which the digital service evaluation system 100 may operate, according to various embodiments described herein. In various embodiments, the server 101 includes one or more of the following: a computer memory 201 for storing programs and data while they are being used, including data associated with the digital service evaluation system 100, an operating system including a kernel, and device drivers; a central processing unit ("CPU") 202 for executing computer programs; a persistent storage device 203, such as a hard drive or flash drive for persistently storing programs and data; and a network connection 204 for connecting to one or more user devices, such as user devices 103*a*-103*c* and/or other computer systems, to send and/or receive data, such as via the Internet or another network and associated networking hardware, such as switches, routers, repeaters, electrical cables and optical fibers, light emitters and receivers, radio transmitters and receivers, and the like, and to scan for and retrieve signals from user devices 103*a*-103*c* and/or other endpoint devices. In various embodiments, the server 101 additionally includes input and output devices, such as a keyboard, a mouse, display devices, etc.

While a server 101 configured as described above is typically used to support the operation of the digital service evaluation system 100, those skilled in the art will appreciate that the digital service evaluation system 100 may be implemented using devices of various types and configurations, and having various components. The memory 201 may include a service evaluation controller 210 which contains computer-executable instructions that, when executed by the CPU 202, cause the server 101 to perform the operations and functions described herein. The memory 201 may also include a client session detector 212 which contains computer-executable instructions that, when executed by the CPU 202, cause the server 101 to perform the operations and functions described herein. For example, the programs referenced above, which may be stored in computer memory 201, may include or be comprised of such computer-executable instructions.

The service evaluation controller 210 and client session detector 212 perform the core functions of the server 101, as discussed herein and also with respect to FIGS. 4 through 10. In particular, the service evaluation controller 210 obtains performance data from user devices 103*a*-103*c*, and uses the performance data to calculate an overall score for a service as well as determine which performance metrics caused a change in the overall score for the service. The service evaluation controller 210 may additionally include instructions to receive an indication from a user of the device type, user satisfaction information, performance metric priority data, etc., from user devices 103*a*-103*c*. The service evaluation controller 210 may additionally contain computer-executable instructions to cause the server to perform some or all of the operations further described in FIGS. 4-10. The service evaluation controller 210 may additionally contain computer-executable instructions to implement an artificial neural network, machine learning, and/or other artificial intelligence components of the system to determine an overall score for a service, client session, sub-session, user, etc., or to determine which performance metric caused a change in the overall score. The service evaluation controller 210 may also include computer-executable instructions for receiving input related to performance data and to the priority of certain performance metrics. For example, the artificial intelligence components of the system may receive in real time digital signals indicative of performance of various client sessions as such session are occurring over time as training data to predict an overall score for a service, client session, sub-session, user, etc. and/or predict which performance metric caused or will cause a change in the overall score. The accuracy of such predictions may be provided in a feedback loop to artificial intelligence components such that the artificial intelligence components may learn which digital signals indicative of performance caused or will cause a change in an overall score.

The client session detector 212 electronically detects digital signals to detect client sessions for use by a user device, such as user devices 103*a*-103*c*, and facilitates communication between the user device and the server for purposes of operating the client session. The client session detector 212 may additionally include instructions to receive an indication of a sub-session and facilitate communication between a user device and the server for purposes of operating the sub-session. For example, a user device may be communicating with the server via a client session and request several videos, which may require the creation of and transmission of at least one video session to the user device via the client session. The client session detector 212 may additionally contain computer-executable instructions to cause the digital service evaluation system 100 to perform some or all of the operations further described in FIGS. 4-10. The client session detector 212 may also include computer-executable instructions for receiving input related to client sessions and sub-sessions, such as login information, demographic information, device information, duration of the session, etc.

In an example embodiment, the service evaluation controller 210, client session detector 212, and/or computer-executable instructions stored on memory 201 of the server 101 are implemented using standard programming techniques. For example, the service evaluation controller 210, client session detector 212, and/or computer-executable instructions stored on memory 201 of the server 101 may be implemented as a "native" executable running on CPU 202, along with one or more static or dynamic libraries. In other embodiments, the service evaluation controller 210, client session detector 212, and/or computer-executable instructions stored on memory 201 of the server 101 may be implemented as instructions processed by a virtual machine that executes as some other program.

Figure 3:
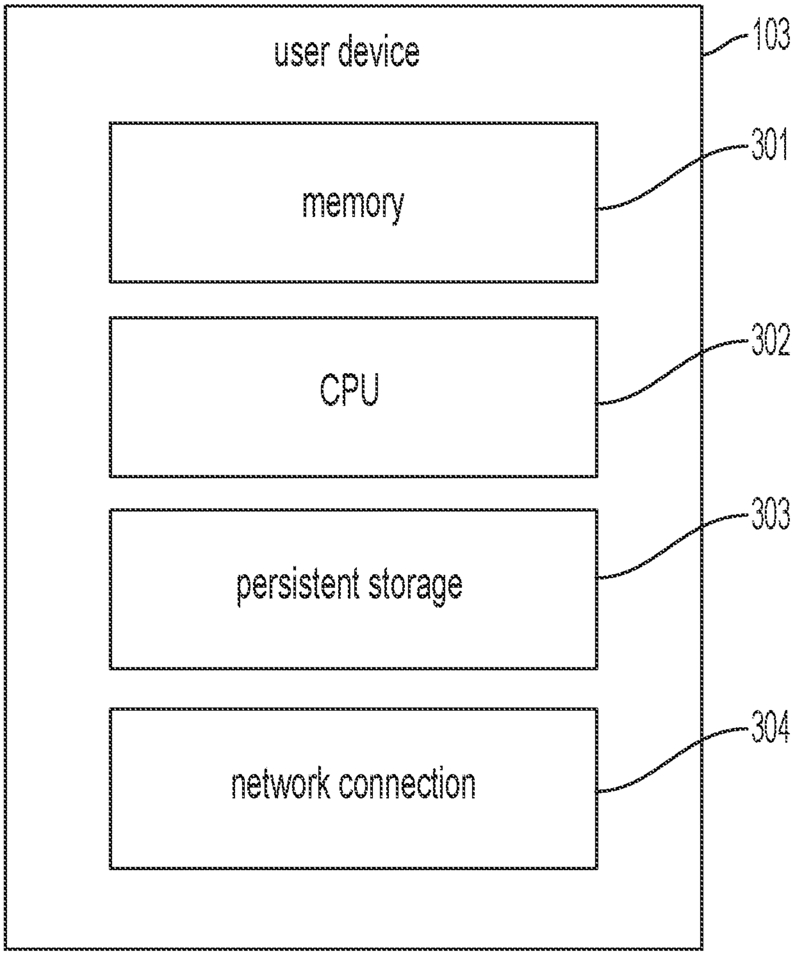
FIG. 3 is a block diagram depicting example components incorporated in a user device which may be included in the digital service evaluation system according to various embodiments described herein.

FIG. 3 is a block diagram depicting example components incorporated in a user device 103 which may be included in the digital service evaluation system 100 according to various embodiments described herein. In various embodiments, the user device 103 includes one or more of the following: a computer memory 301 for storing programs and data while they are being used, including data associated with the digital service evaluation system 100, an operating system including a kernel, and device drivers; a central processing unit ("CPU") 302 for executing computer programs; a persistent storage device 303, such as a hard drive or flash drive for persistently storing programs and data; and a network connection 304 for connecting to one or more user devices, such as user devices 103*a*-103*c*, server 101, and/or other computer systems, to send and/or receive data, such as via the Internet or another network and associated networking hardware, such as switches, routers, repeaters, electrical cables and optical fibers, light emitters and receivers, radio transmitters and receivers, and the like. While a user device 103 configured as described above is typically used to support the operation of the digital service evaluation system 100, those skilled in the art will appreciate that the digital service evaluation system 100 may be implemented using devices of various types and configurations, and having various components.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the digital service evaluation system 100.

In addition, programming interfaces to the data stored as part of the service evaluation controller 210 and client session detector 212 can be available by standard mechanisms such as through C, C++, C#, and Java APIs; libraries for accessing files, databases, or other data repositories; through scripting languages such as JavaScript and VBScript; or through Web servers, FTP servers, or other types of servers providing access to stored data. The service evaluation controller 210 and client session detector 212 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the server 101 and/or user devices 103*a*-103*c*.

Furthermore, in some embodiments, some or all of the components/portions of the service evaluation controller 210, client session detector 212, and/or functionality provided by the computer-executable instructions stored on memory 201 of the server 101 may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, user devices, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

Figure 4A:
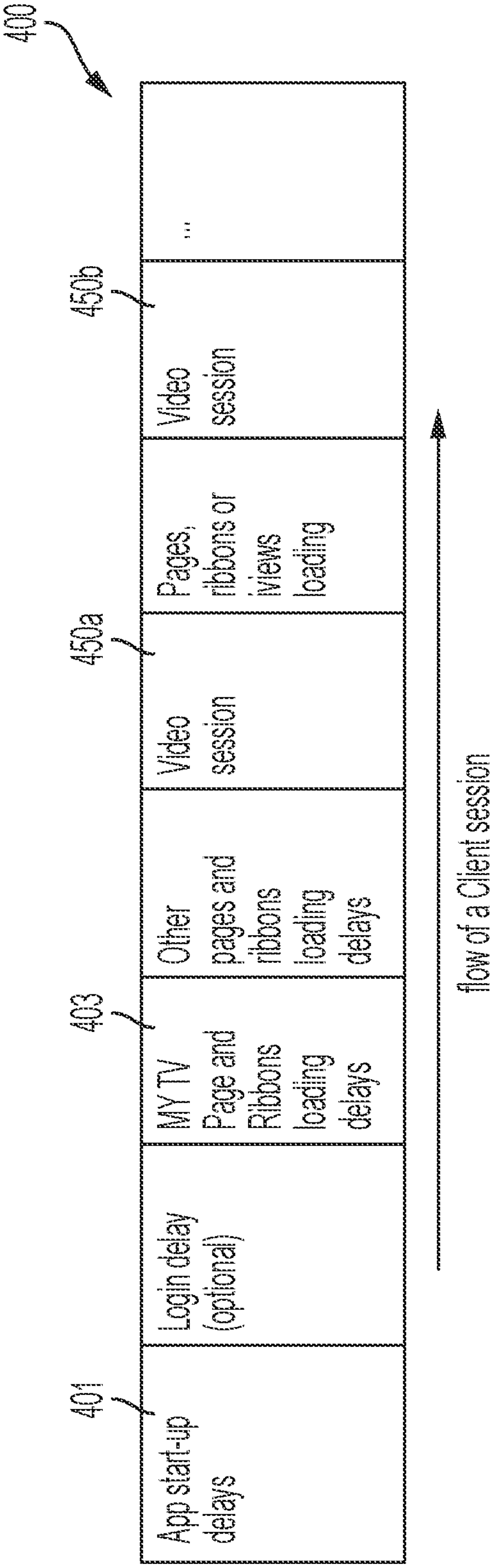
FIG. 4A is a flow diagram depicting an example flow of a client session, according to various embodiments described herein.

FIG. 4A is a flow diagram depicting an example flow of a client session 400, according to various embodiments described herein. Client session 400 includes multiple blocks each relating to different stages of operation of the client session, such as the start-up delay block 401, loading delay block 403, and zero or more video sessions 450*a* and 450*b*. The client session 400 may include other blocks related to other aspects of a client session (not shown), such as logging in, crashing, idle time, search time, loading delays for specific pages, content discovery time, customer feedback, etc. Although client session 400 depicted in FIG. 4A includes multiple video sessions, it is to be appreciated by one skilled in the art that other types of sub-sessions could be included in the client session 400, such as audio sessions, game sessions, etc.

At start-up block 401, the client session 400 begins and the digital service evaluation system 100 may collect performance data related to the time required to start the client session 400. At loading delay block 403, the interface of the client session 400 is loaded, and the system may collect performance data related to the time required to load the interface. At video session blocks 450*a* and 450*b*, the client session 400 receives a video session 450, and the digital service evaluation system 100 may collect performance data related to the video session 450. The client session 400 may collect performance data to other aspects of the client session (not shown), such as logging in, crashing, idle time, search time, loading delays for specific pages, content discovery time, customer feedback, etc.

Figure 4B:
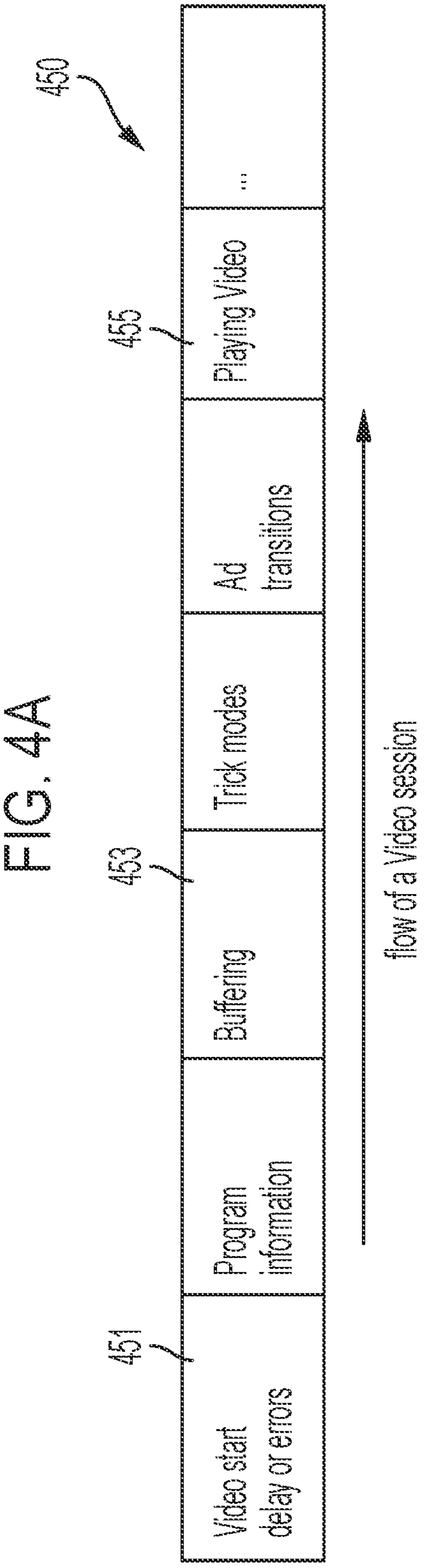
FIG. 4B is a flow diagram depicting an example flow of a video session, according to various embodiments described herein.

FIG. 4B is a flow diagram depicting an example flow of a video session 450, according to various embodiments described herein. A video session 450 includes multiple blocks each relating to different stages of operation of the video session, such as the start delay block 451, buffering block 453, and a playing video block 455. The video session 450 may include other blocks related to other aspects of a video session (not shown), such as loading program information, ad transitions, re-buffering times, crashing, etc.

At start delay block 451, the video session begins and the digital service evaluation system 100 may collect performance data related to the time required to start the video session. At buffering block 453, the video session buffers, or loads, the video onto a user device, and the digital service evaluation system 100 may collect performance data related to the time required to load the video. At playing video block 455, the user device plays the buffered video indicated by the video session, and the digital service evaluation system 100 may collect performance data related to playing the video. The digital service evaluation system 100 may also collect other performance data related to the video session (not shown), such as failure rate, black frames, video quality, audio quality, ad transitions, re-buffering times, crashing, loading program information, etc. Collection of such performance data includes electronic detection in real time of the video session buffering or loading the video onto a user device and the digital video failure rate, black frames, video quality, audio quality, ad transitions, re-buffering times, crashing, loading program information as the session is occurring at data rates of millions of bits per second and cannot be performed in the human mind.

The digital service evaluation system 100 may collect performance data related to the client session, video session, or other sub-sessions, by prompting the user for feedback during, after, or before a session. The digital service evaluation system 100 may collect performance data related to the client session, video session, or other sub-sessions via logs created during the life of the session. The digital service evaluation system 100 may collect performance data related to the client session, video session, or other sub-sessions via external Application Programming Interfaces (APIs) configured to obtain performance data related to the sessions. The digital service evaluation system 100 may collect performance data related to the client session, video session, or other sub-sessions via an API configured to operate or manage the sessions. In some embodiments, the digital service evaluation system 100 requests the performance data from an API configured to operate or mange the sessions. In some embodiments, the API configured to operate or manage the sessions pushes the performance data to the digital service evaluation system 100.

FIG. 5 is a table diagram representing a service evaluation data structure, according to various embodiments described herein. The service evaluation data structure includes a client session id column 510, a customer id column 511, a number of video sessions column 512, an app startup time column 513, a video session crashed column 514, a user score 515, and a client session score 516. The client session id column 510 includes information indicating client sessions. The customer id column 511 includes information indicating specific customers. The number of video sessions column 512 includes information indicating the number of video sessions transmitted to the user device during a client session. The app startup time column 513 includes information indicating the amount of time needed to start the service application. The video session crashed column 514 includes information indicating the number of the video sessions which crashed during the client session. The user score column 515 includes information indicating a score given by the user for the performance of the service during the client session. The client session score column 516 includes information indicating the overall score of the client session. In some embodiments, additional data (not shown) is included in the service evaluation data structure which may include information indicating any other performance metric or performance data collected by the digital service evaluation system 100. This additional data may include, for example, video quality data, client session crash data, loading delays for specific pages or modules within the service, search success, content discovery time, app store ratings, customer support calls, a video session score, or any other data related to the performance of the service, client session, sub-session, etc.

In some embodiments, the overall score of the client session, stored in column 516, is calculated based on the data stored within the service evaluation data structure. The digital service evaluation system 100 may receive the data after each type of data has been converted to conform to the same scale. The digital service evaluation system 100 may convert the data within the service evaluation data structure to conform to the same scale before calculating the overall score of the client session. The digital service evaluation system 100 may calculate a video session score based on data gathered during a video session 450, and may use that video session score as part of calculating the client score. The digital service evaluation system 100 may calculate a customer score based on data regarding customer feedback, and may use that customer score as part of calculating the client score. The digital service evaluation system 100 may use each of the client scores stored in the service evaluation data structure to calculate an overall score for the service. The digital service evaluation system 100 may use a similar data structure (not shown) to store performance data regarding, and calculate an overall score for, a service as a whole, a customer, a device or group of devices, a sub-session, a device type, etc.

As shown in FIG. 5, rows 501-503 each contain sample data to illustrate how a client session score is calculated. In row 501, the client session included five video sessions, took 15 ms to start, included one video session which crashed, and received a user score of 3/5. The digital service evaluation system 100 used this data to calculate an overall client session score of "7." The client session indicated by row 502 performed better overall than the client session of row 501, which resulted in a client session score of "9." The client session indicated by row 503 performed more poorly overall than the client session of row 501, and resulted in an overall score of "4."

Figure 6A:
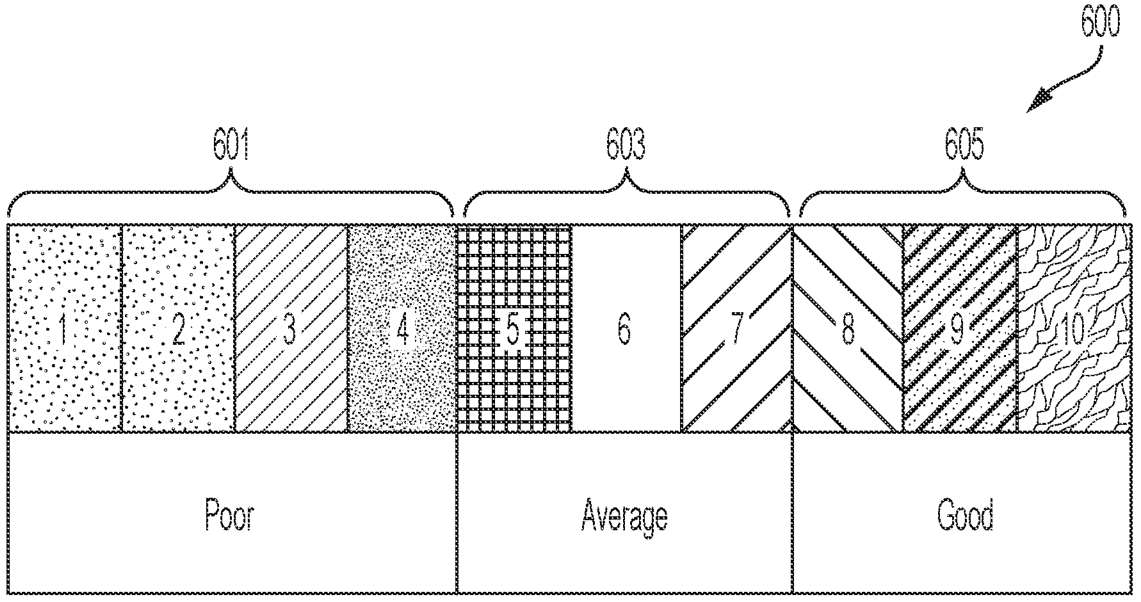
FIG. 6A depicts an example linear scale for depicting the overall score of a service, client session, customer or user, group of devices, sub-session, a device type, etc., according to various embodiments described herein.
Figure 7:
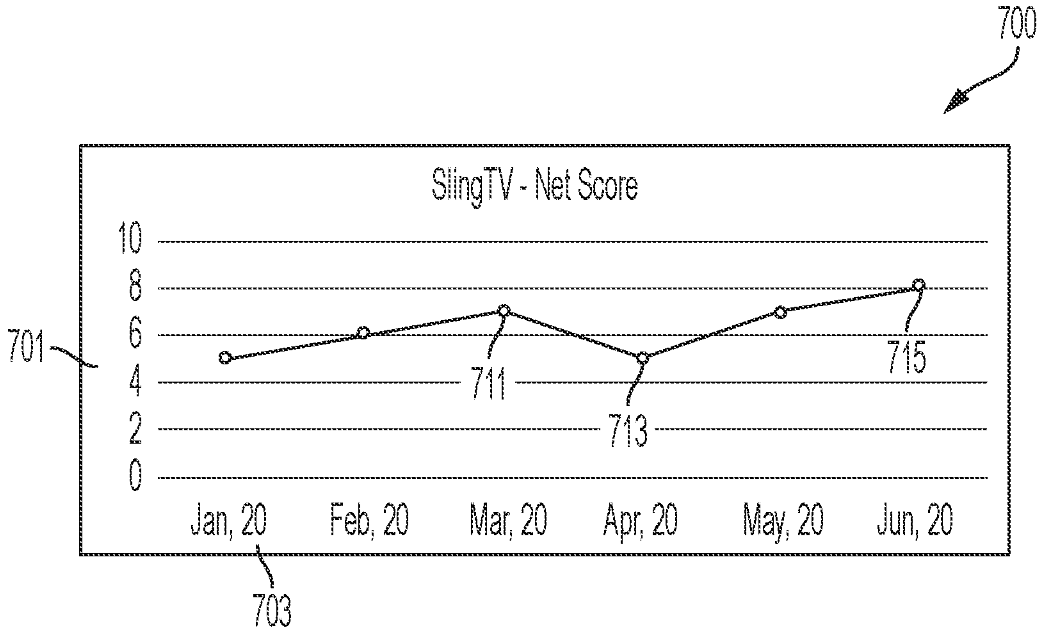
FIG. 7 depicts an example net score graph for depicting the change in the overall score for a service over time, according to various embodiments described herein.

FIG. 6A depicts an example linear scale 600 for depicting the overall score of a service, client session, customer or user, group of devices, sub-session, a device type, etc., according to various embodiments described herein. Linear scale 600 includes a poor score section 601, an average score section 603, and a good score section 605. The poor score section 601 includes scores between 1 and 4. The average score section 603 includes scores between 5 and 7. The good section 605 includes scores between 8 and 10. The digital service evaluation system 100 may utilize the linear scale to assign an overall score between 1 and 10. Additionally, in some embodiments, the digital service evaluation system 100 may depict each score by using a different color or marking, as represented by the markings shown in each number area of the poor score section 601, averages score section 603, and good score section 605. The digital service evaluation system 100 may then use scores assigned to a service, client session, customer or user, group of devices, sub-session, device type, etc. to determine whether the score has changed over time or perform other analysis. For example, the overall score for a service may be used to compare the service to another service to determine which service performs better. Additionally, the overall scores may be used to chart the change in the overall score over time, as depicted in FIG. 7. After multiple overall scores are obtained, the digital service evaluation system 100 may use the overall scores to determine weights for performance metrics by comparing the change in each performance metric to the change in overall scores over time.

Figure 6B:
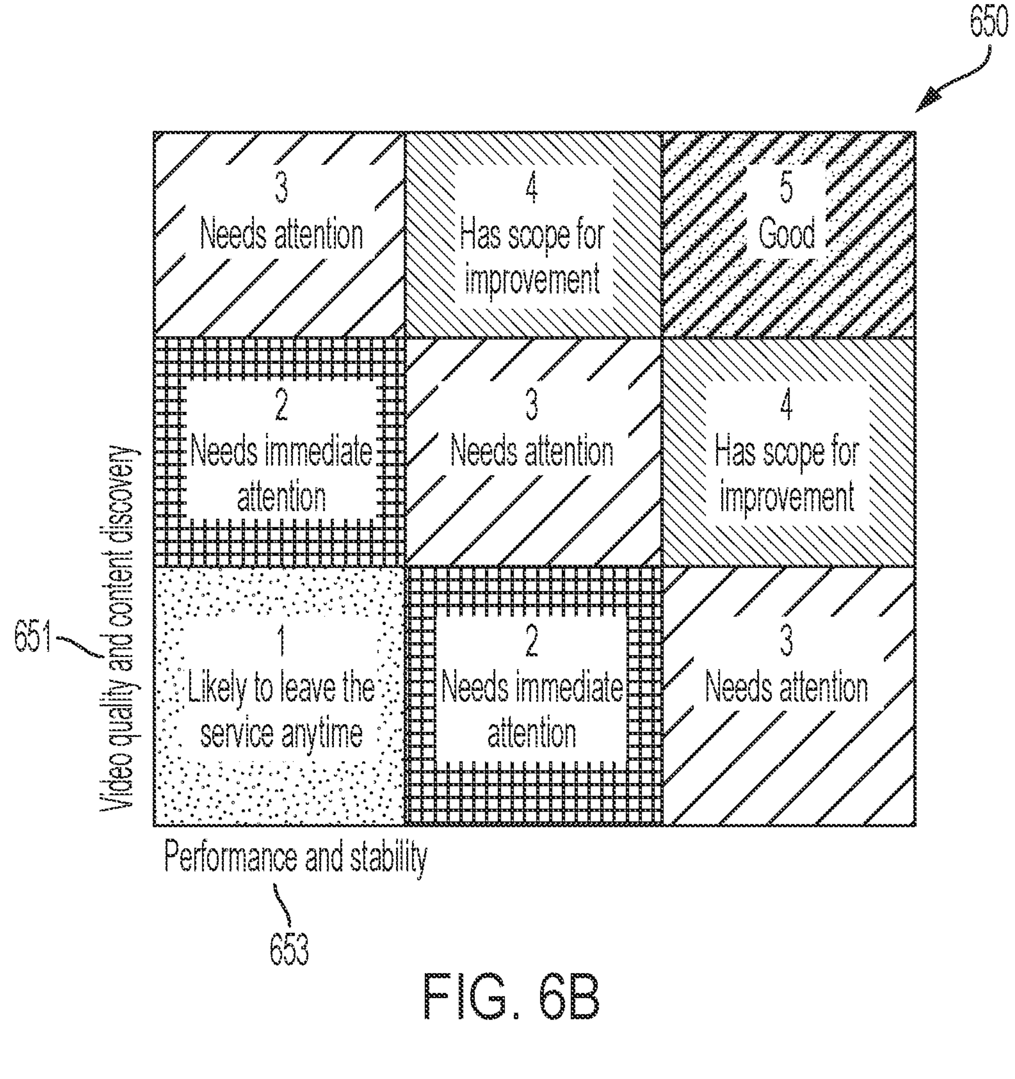
FIG. 6B depicts an example matrix scale for depicting the overall score of a service, client session, customer or user, group of devices, sub-session, a device type, etc., according to various embodiments described herein.

FIG. 6B depicts an example matrix scale 650 for depicting the overall score of a service, client session, customer or user, group of devices, sub-session, device type, etc., according to various embodiments described herein. The matrix scale 650 includes a video quality and content discovery axis 651 and a performance and stability axis 653. The system to evaluate services may calculate a video quality and content discovery score based on certain performance metrics, such as searching time, video streaming quality, audio quality, etc. and plot the score on the video quality and content discovery axis 651. The system to evaluate services may additionally calculate a performance and discovery score based on certain performance metrics, such as crash rate, buffering time, search query speed, etc., and plot the score on the performance and stability axis 653. The matrix scale can be used to quickly compare different performance metrics, such as the "video quality and content discovery" and "performance and stability metrics" shown in FIG. 6B. Additionally, in some embodiments, the digital service evaluation system 100 may depict each score in the matrix scale by using a different color or marking, as represented by the markings shown in the matrix scale 650. In the matrix scale, scores may be represented by the same color, yet convey different information. For example, a score of "4" as represented by the matrix scale 650 may indicate that the video quality score is at its maximum, where the performance score is only average. Likewise, the score of "4" may indicate that the video quality score is average, but the performance score is at its maximum. It is to be appreciated that FIG. 6B illustrates one example of a matrix scale, and that other performance metrics may be used in conjunction with the matrix scale 650. Additionally, the matrix scale may include more than two axes in order to depict data from more than two different performance metrics.

FIG. 7 depicts an example net score graph 700 for depicting the change in the overall score for a service over time, according to various embodiments described herein. The net score graph 700 depicts the change in score for the SlingTV service and includes an overall score axis 701 and a time axis 703. As shown at data point 711, the overall score of the service was "7" in March, 2020. At data point 713, the score has dropped to "5" in April, 2020, and at data point 715 the overall score has risen to "8" in June, 2020. The digital service evaluation system 100 calculates the net score to provide a representation of the service's performance overall, and provides a representation of that score over time. This allows the digital service evaluation system 100 to determine that something happened in April to lower the overall performance of the service. Additionally, the digital service evaluation system 100 may combine this information with the weights of the performance metrics and the performance data obtained over the time period from March to April, and determine which performance metric caused the drop in score from data point 711 to data point 713. This analysis can additionally be performed with regards to data point 713 and data point 715 to determine what caused the overall performance of the service to rise from April to June.

The graphical depictions of FIGS. 6A-7 may be part of or comprise a graphical user interface (GUI) of the digital service evaluation system 100 that is, for example, presented on a display or screen connected or otherwise in operable communication with server 101. In some embodiments, each component of FIGS. 6A-7 may be an interactive user interface element that, when selected, causes additional information regarding that component to be displayed on the screen. For example, selection of the video quality and content discovery axis 651 may cause performance metric values related to that axis, such as searching time, video streaming quality, audio quality, etc., to be displayed in the GUI for a particular service, client session, customer or user, group of devices, sub-session, a device type, etc. Furthermore, a score plotted on the matrix scale 650 for a particular service, client session, customer or user, group of devices, sub-session, a device type, etc., may be selected, which causes individual performance metric values on which that score is based to be presented.

Figure 8:
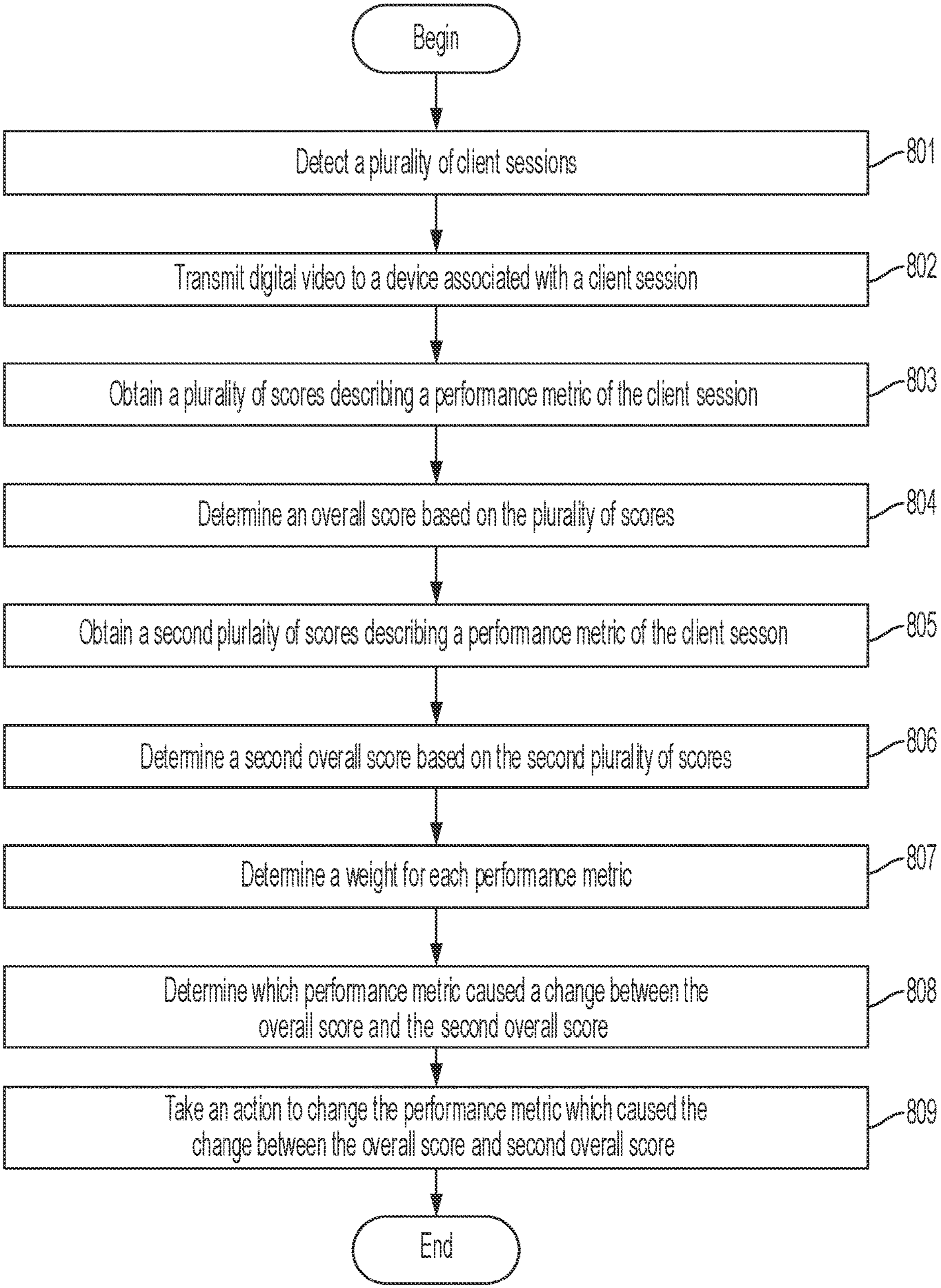
FIG. 8 is a flow diagram depicting a process for determining which performance metric caused a change between a first overall score and a second overall score, according to various embodiments described herein.

FIG. 8 is a flow diagram depicting a process for determining which performance metric caused a change between an overall score and a second overall score, according to various embodiments described herein. At act 801, a digital service evaluation system 100 detects a plurality of client sessions. At act 802, the digital service evaluation system 100 transmits digital video to a device associated with a client session. At act 803, the digital service evaluation system 100 obtains a first plurality of scores describing a performance metric of the client session. In some embodiments, the digital service evaluation system 100 obtains the first plurality of scores directly from the device associated with the client session. In some embodiments, the digital service evaluation system 100 obtains the first plurality of scores from a source other than the device associated with the client session, such as a separate server, computing device, user input, etc. At act 804, the digital service evaluation system 100 determines a first overall score based on the plurality of scores. In some embodiments, the plurality of scores are altered to conform to the same scale before determining the overall score.

At act 805, the digital service evaluation system 100 obtains a second plurality of scores, in a similar manner to obtaining the plurality of scores in act 803. At act 806, the digital service evaluation system 100 determines a second overall score based on the second plurality of scores in a similar manner to act 804. At act 807, the digital service evaluation system 100 determines a weight for each performance metric by comparing the first overall score to the second overall score, and comparing the first plurality of scores to the second plurality of scores. At act 808, the digital service evaluation system 100 determines which performance metric caused a change between the overall score and the second overall score. In some embodiments, the digital service evaluation system 100 uses the weight for each performance metric to create a weighted formula for calculating the overall score. The digital service evaluation system 100 may use the weighted formula to determine which performance metric caused a change between the first overall score and the second overall score. At act 809, the digital service evaluation system 100 takes an action to change the performance metric which caused the change between the overall score and the second overall score. In some embodiments, the digital service evaluation system 100 does not take an action if the second overall score is higher than the first overall score.

In some embodiments, a portion of the first plurality of scores is obtained via user input. The user input may be obtained via a survey presented on the device associated with the client session.

In some embodiments, the performance metrics relate to the performance of one or more devices having access to the service. The performance metrics may be related to: a crash rate of the client session, a video quality of the digital video, a time spent buffering the digital video, a time spent accessing the client session, a likelihood that a user of the device would recommend the service, etc.

In some embodiments, the digital service evaluation system 100 receives an indication that one or more performance metrics should be prioritized. The digital service evaluation system 100 may alter the weights of each performance metric based on the indication that one or more performance metrics should be prioritized. The digital service evaluation system 100 may alter the weighted formula based on the indication that one or more performance metrics should be prioritized.

In some embodiments, the performance metrics include performance data related to an application receiving a client session or sub-session. The performance metrics may include data obtained from crash reports and application logs related to an application receiving a client session or sub-session.

In some embodiments, the digital service evaluation system 100 uses a plurality of overall scores for a plurality of client sessions to determine an overall score for a service. The digital service evaluation system 100 may obtain a second plurality of overall scores for each of the plurality of client sessions at a future time. The digital service evaluation system 100 may use the first plurality of overall scores for a plurality of client sessions and the second plurality of overall scores for a plurality of client sessions to determine which performance metric caused a change between the first plurality of overall scores and the second plurality of overall scores. The digital service evaluation system 100 may then take an action to change the performance metric which caused a change between the first plurality of overall scores and the second plurality of overall scores.

Figure 9:
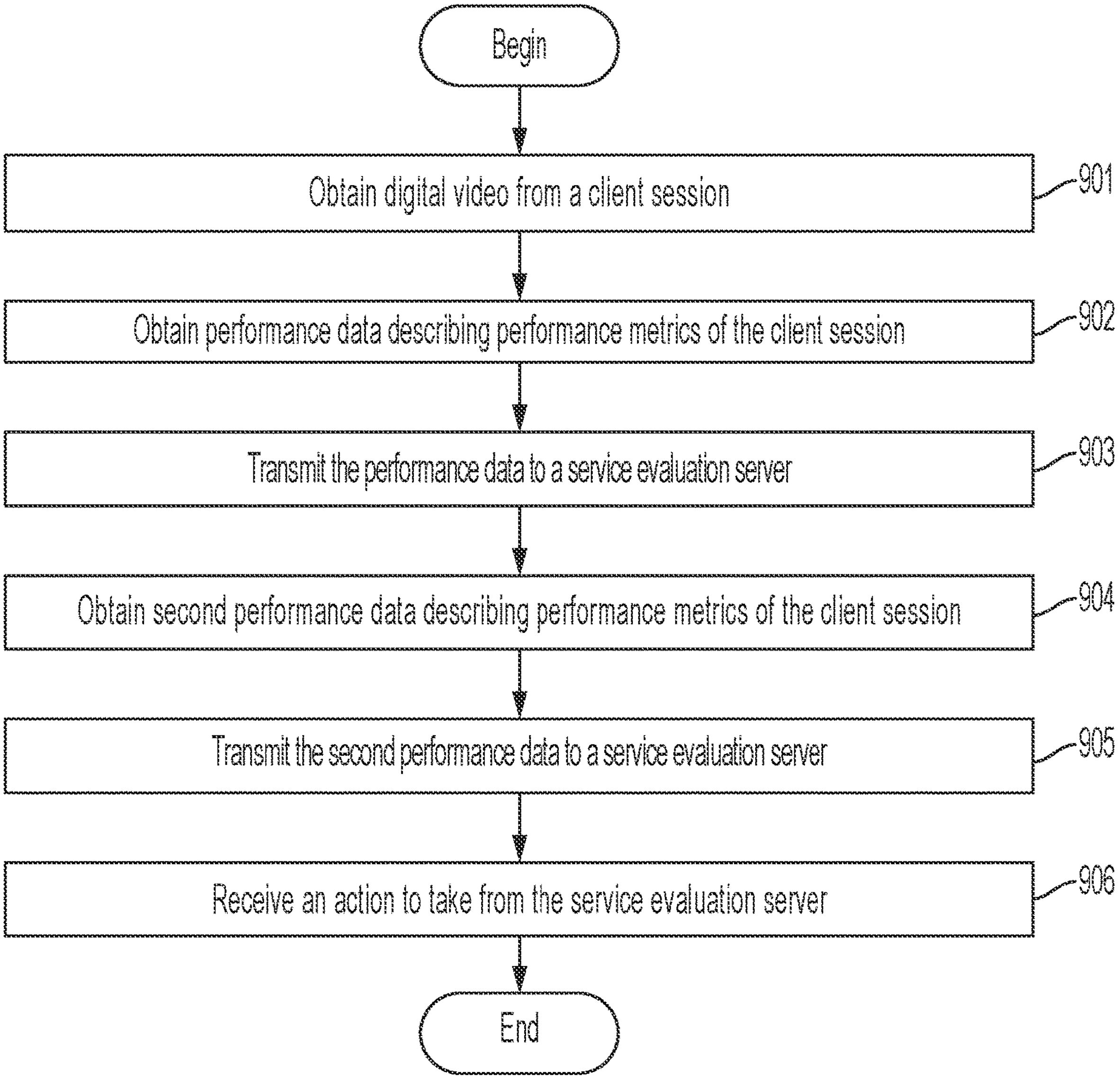
FIG. 9 is a flow diagram depicting a process for obtaining performance data and receiving an action to take from a service evaluation server, according to various embodiments described herein.

FIG. 9 is a flow diagram depicting a process for obtaining performance data and receiving an action to take from a service evaluation server, according to various embodiments described herein. At act 901, a computing device obtains digital video from a client session. In some embodiments, the computing device obtains the digital video via a video session. At act 902, the computing device obtains performance data describing performance metrics of the client session. In some embodiments, the performance data is obtained via logs or crash reports generated by the client session. In some embodiments, the performance data is obtained via an API used to implement an application receiving the client session. At act 903, the computing device transmits the performance data to a service evaluation server. In some embodiments, the computing device alters the performance data to conform with the same scale.

At act 904, the computing device obtains a second set of performance data describing performance metrics of the client session in a similar manner to act 902. At act 905, the computing device transmits the second performance data to the service evaluation server. At act 906, the computing device receives an indication of an action to take from the service evaluation server. In some embodiments, the indication of an action to take is based on a determination by the service evaluation server that a performance metric caused a change in an overall score calculated by the service evaluation server based on the performance data and the second performance data.

In some embodiments, the computing device prompts the user for information related to the performance of the client session. The digital service evaluation system 100 may use the information related to the performance of the client session as at least a portion of the performance data.

In some embodiments, the computing device obtains, via user input, an indication of one or more prioritized performance metrics. The computing device may transmit the indication of one or more prioritized performance metrics to the service evaluation server.

In some embodiments, where the computing device receives a video session, the computing device obtains video performance data describing one or more performance metrics of the video session. The computing device may transmit the video performance data to the service evaluation server. The computing device may receive an indication of an action to take from the service evaluation server based on a determination that a performance metric of the video session caused a change in the overall performance of the video session.

Figure 10:
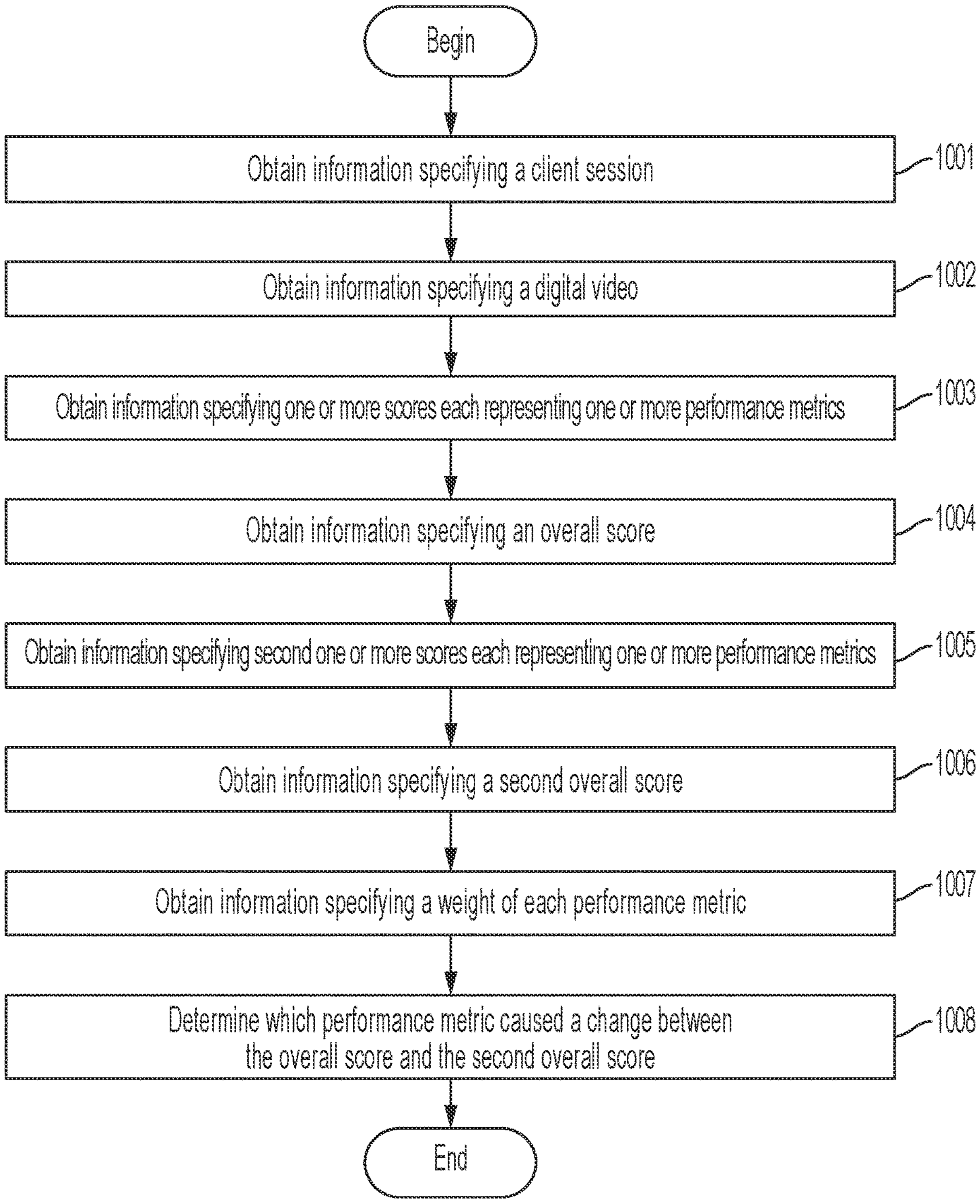
FIG. 10 is a flow diagram depicting a process for obtaining performance data for a service evaluation data structure, according to various embodiments described herein.

FIG. 10 is a flow diagram depicting a process for obtaining performance data for a service evaluation data structure, according to various embodiments described herein. At act 1001, the digital service evaluation system 100 obtains information specifying a client session. At act 1002, the digital service evaluation system 100 obtains information specifying a digital video. The information specifying a digital video may be associated with the client session. The client session may be associated with a video session which is associated with the digital video. At act 1003, the digital service evaluation system 100 obtains information specifying one or more scores representing one or more performance metrics. In some embodiments, the information specifying one or more scores is obtained via logs or crash reports generated by the client session. In some embodiments, the information specifying one or more scores is obtained via an API used to implement an application receiving the client session. In some embodiments, the information specifying one or more scores is obtained via user input. In some embodiments, the one or more scores are altered to conform with the same scale. At act 1004, the digital service evaluation system 100 obtains information specifying an overall score. The digital service evaluation system 100 may calculate the overall score based on the information specifying one or more scores.

At act 1005, the digital service evaluation system 100 obtains information specifying second one or more scores each representing the one or more performance metrics in a similar manner to act 1003. At act 1006, the digital service evaluation system 100 obtains information specifying a second overall score in a similar manner to act 1004. At act 1007, the digital service evaluation system 100 obtains information specifying a weight of each performance metric based on a comparison of the overall score to the second overall score and the information specifying one or more scores and the information specifying second one or more scores. At act 1008, the digital service evaluation system 100 determines which performance metric caused a change between the overall score and second overall score based on the weight of each performance metrics. In some embodiments, the digital service evaluation system 100 obtains a weighted function based on the weight of each performance metric. The digital service evaluation system 100 may use the weighted function to determine which performance metric caused a change between the overall score and the second overall score.

In some embodiments, the service evaluation data structure includes information indicating which performance metrics should be prioritized. The digital service evaluation system 100 may alter the weights of each performance metric based on the information indicating which performance metrics should be prioritized.

In some embodiments, the service evaluation data structure includes information specifying one or more video scores representing performance metrics of one or more video sessions. The digital service evaluation system 100 may use the video scores when determining the overall score. The digital service evaluation system 100 may utilize the video scores to determine an overall video metric describing the performance of one or more video sessions.

In some embodiments, the service evaluation data structure includes information specifying a service performance metric based on the overall metric for a plurality of client sessions. The service evaluation data structure may use the service performance metric to determine an overall score for the service.

In some embodiments, the service evaluation data structure includes information specifying a device type for each client session. The service evaluation data structure may use the device type to compare the performance of client sessions with different device types. The service evaluation data structure may use the device type to compare the performance of client sessions with the same device type.

In some embodiments, the service evaluation data structure includes information specifying a service type for each client session. The service evaluation data structure may use the service type to compare the performance of client sessions with different service types. The service evaluation data structure may use the service type to compare the performance of client sessions with the same service type.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A service evaluation system, comprising:

at least one processor; and at least one memory coupled to the at least one processor, the memory having computer-executable instructions stored thereon that, when executed by the at least one processor, cause the system to:

detect a client session between a user device and one or more server computing devices that provide a digital service, the user device being in a client-server relationship with the one or more server computing devices that provide a digital service, the user device being provided with access to the digital service via the client session, and wherein the user device is:

configured to transmit data associated with the client session to the one or more server computing devices that provide the user device with access to the digital service via the client session, and configured to receive data associated with the client session from the one or more server computing devices that provide the user device with access to the digital service via the client session, the data associated with the client session including performance data for the client session;

determine a first overall score describing an overall metric of the client session at a first time by applying a machine learning model to at least a first plurality of scores, each score of the first plurality of scores describing a different performance metric of a plurality of performance metrics of the client session, each of the scores of the first plurality of scores being determined based on first performance data for with the client session;

determine a second overall score describing the overall metric of the client session at a second time by applying the machine learning model to at least a second plurality of scores, each score of the second plurality of scores describing a different performance metric of the plurality of performance metrics of the client session, each of the scores of the second plurality of scores being determined based on second performance data for the client session;

determine a weight of each performance metric of the plurality of performance metrics based on at least the first plurality of scores, the second plurality of scores, the first overall score, and the second overall score;

determine whether the second overall score is better than the first overall score; and based on a determination that the second overall score is not better than the first overall score:

determine an extent to which each respective performance metric of the plurality of performance metrics caused a change in the overall metric between the first time and the second time based on at least the weight of the respective performance metric, the first plurality of scores, and the second plurality of scores;

identify a performance metric of the plurality of performance metrics of the client session that caused the greatest change in the overall metric based on the determined extent to which each performance metric caused a change in the overall metric between the first time and the second time;

determine an action to take based on the performance metric that caused the greatest change in the overall metric, wherein the action causes an aspect of the digital service, the client session, or the user device, to be improved, the aspect being associated with the performance metric that caused the greatest change in the overall metric, the action comprising one or more of:

obtaining diagnostic data related to the client session;

identifying at least one cause of the change in the overall metric based on based on diagnostic data, identified performance metrics, and the at least one aspect of the digital service;

changing an aspect of a subscription to the digital service associated with a user of the device;

causing an entity to change an aspect of the digital service, client session, or user device, by transmitting an indication of diagnostic data related to the client session to an entity associated with an aspect of the digital service, the entity being selected based on an identification of an aspect of the digital service represented by the identified performance metric; and causing an entity to change an aspect of the digital service, client session, or user device, by transmitting an indication of at least one cause of the change in the overall metric to an entity associated with an aspect of the digital service, the entity being selected based on an identification of an aspect of the digital service represented by the identified performance metric; and cause the digital service to be improved by causing the improvement to the aspect of the digital service, the client session, or the device to be made by taking the action.

2. The service evaluation system of claim 1, wherein to take determine the action, the computer-executable instructions further cause the system to:

identify at least one aspect of the digital service based on the identified performance metric; and determine at least one action to change the at least one aspect of the digital service based on the identified performance metric and the at least one aspect of the digital service.

3. The service evaluation system of claim 1, wherein one or more scores of the first plurality of scores is obtained via user input obtained from the device.

4. The service evaluation system of claim 1, wherein the different performance metrics of the client session comprise performance metrics related to performance of the device.

5. The service evaluation system of claim 4, wherein the performance metrics related to the performance the device include performance metrics related to at least one of:

a crash rate of the client session;

a quality of content provided by the digital service;

a time spent buffering content provided by the digital service;

a time spent accessing the client session; or a likelihood a user of the device would recommend the digital service.

6. The service evaluation system of claim 1, wherein the computer-executable instructions further cause the system to:

receive an indication of whether one or more performance metrics should be prioritized; and alter the weight of at least one performance metric based on the indication of whether one or more performance metrics should be prioritized.

7. The service evaluation system of claim 1, wherein the different performance metrics of the client session comprise performance metrics related to performance of an application receiving the client session.

8. The service evaluation system of claim 1, wherein the different performance metrics include information obtained from crash reports and application logs.

9. A non-transitory processor-readable storage medium that stores at least one of instructions or data, the instructions or data, when executed by at least one processor, cause the at least one processor to:

identify a client session of a device and one or more server computer devices that provide a digital service, the device being in a client-server relationship with the one or more server computing devices that provide a digital service, the device being provided with access to the digital service via the client session, and wherein the device is configured to:

transmit data associated with the client session to the one or more server computing devices that provide the device with access to the digital service via the client session, and receive data associated with the client session from the one or more server computing devices that provide the device with access to the digital service via the client session, the data associated with the client session including performance data for the client session;

at a first time apply a machine learning model to a first plurality of scores, each score of the first plurality of scores describing at least one performance metric of a plurality of performance metrics of the client session, each score of the first plurality of scores being normalized, to determine a first overall score of the client session, and each of the first plurality of scores being determined based on first performance data for the client session;

at a second time apply the machine learning model to a second plurality of scores, each score of the second plurality of scores describing at least one performance metric of the plurality of performance metrics of the client session, each score of the second plurality of scores being determined based on second performance data for the client session, to determine a second overall score of the client session;

determine a weight for each performance metric of the plurality of performance metrics based on at least the first plurality of scores, the second plurality of scores, the first overall score, and the second overall score;

determine an extent to which each respective performance metric of the plurality of performance metrics caused a change in the overall score based on the weight of each respective performance metric, the first plurality of scores, and the second plurality of scores;

identify one or more performance metrics of the plurality of performance metrics of the client session that caused the greatest change in the overall score based on the extent to which each respective performance metric of the plurality of performance metrics caused a change in the overall score;

determine an action to take based on the identified one or more performance metrics that caused the greatest change in the overall score, wherein the action causes an aspect of the digital service, device, or client session associated with the performance metric that caused the greatest change in the overall metric to be improved, the action comprising one or more of:

obtaining diagnostic data related to the client session;

identifying at least one cause of the change in the overall score based on the client session based on diagnostic data, identified performance metrics, and the at least one aspect of the digital service;

changing an aspect of a subscription to the digital service associated with a user of the device;

causing an entity to change an aspect of the digital service, client session, or device, by transmitting an indication of diagnostic data related to the client session to an entity associated with an aspect of the digital service, the entity being selected based on an identification of an aspect of the digital service represented by the identified performance metric; and causing an entity to change an aspect of the digital service, client session, or device, by transmitting an indication of at least one cause of the change in the overall score to an entity associated with an aspect of the digital service, the entity being selected based on an identification of an aspect of the digital service represented by the identified performance metric; and cause the digital service to be improved by causing the improvement to the aspect of the digital service, the client session, or the device to be made by taking the action.

10. The non-transitory processor-readable storage medium of claim 9, wherein to determine the action to take, the processor is further caused to:

identify at least one aspect of the digital service based on the identified one or more performance metrics; and determine at least one action to change the at least one aspect of the digital service based on the identified one or more performance metrics and the at least one aspect of the digital service.

11. The non-transitory processor-readable storage medium of claim 10, wherein the at least one action includes causing the processor to:

receive diagnostic data related to the client session;

identify at least one cause of the change in the overall score of the client session based on the diagnostic data, the identified one or more performance metrics, and the at least one aspect of the digital service;

identify at least one entity associated with the at least one aspect of the digital service; and cause the diagnostic data and the at least one cause to be transmitted to the at least one entity.

12. The non-transitory processor-readable storage medium of claim 11, wherein the diagnostic data includes at least one of:

information regarding the performance of the client session; and information received from a user of the device.

13. The non-transitory processor-readable storage medium of claim 10, wherein the at least one action includes causing the processor to:

receive diagnostic data related to the client session;

identify at least one cause of the change in the overall score of the client session based on the diagnostic data, the identified one or more performance metrics, and the at least one aspect of the digital service;

determine whether the cause of the change in the overall score of the client session is related to an aspect of a subscription to the digital service by a user of the device; and based on a determination that the cause of the change is related to an aspect of the subscription, cause an aspect of the subscription to the digital service to be changed based on the at least one cause.

14. The non-transitory processor-readable storage medium of claim 10, wherein to identify the at least one aspect of the digital service, the processor is further caused to:

receive a plurality of overall scores for client sessions other than the client session; and identify at least one cause of the change in the overall score of the client session based on a comparison of the overall score for the client session to the plurality of overall scores, the identified one or more performance metrics, and the at least one aspect of the digital service.

15. A system, comprising:

at least one processor; and at least one memory coupled to the at least one processor, the memory having computer-executable instructions stored thereon that, when executed by the at least one processor, cause the system to:

detect a plurality of client sessions, each client session being provided to at least one device by one or more server computing devices that provide a digital service, each of the at least one device being in a client-server relationship with the one or more server computing devices that provide the digital service to the at least one device, wherein each client session is configured to facilitate the transmission of data between a device associated with the client session and the one or more server computing devices that provide the digital service, and wherein data associated with the client session includes performance data for the client session;

determine a first overall score of the digital service at a first time by applying a machine learning model to at least a first plurality of overall client session scores, each respective score of the first plurality of overall client session scores being determined based on a first plurality of scores of a respective client session of the plurality of client sessions determined based on performance data of the respective client session, each respective score of the first plurality of overall client session scores being normalized, and each of the one or more performance metrics being determined based on data associated with the respective client session;

determine a second overall score of the digital service at a second time by applying the machine learning model to at least a second plurality of overall client session scores, each respective score of the second plurality of overall client session scores being determined based on a second plurality of scores for a respective client session of the plurality of client sessions based on performance data of the respective client session;

determine a weight of each client session of the plurality of client sessions based on at least the first plurality of overall scores, the second plurality of overall scores, the first overall score, and the second overall score;

determine whether the second overall score is greater than the first overall score;

based on a determination that the second overall score is not greater than the first overall score:

determine an extent to which each respective client session of the plurality of client sessions caused a change in the overall score between the first time and the second time based on at least a weight of the respective client session, the first plurality of scores, and the second plurality of scores;

identify one or more client sessions of the plurality of client sessions which had the greatest impact in the change between the first overall score and the second overall score;

determine an action to take based on the client session that caused the greatest change in the overall score, wherein the action causes the digital service to improve by changing an aspect of the digital service, the client session that caused the greatest change in the overall score, or a device associated with the client session that caused the greatest change in the overall score, to be changed, the aspect being associated with the client session that caused the greatest change in the overall score, the action comprising one or more of:

obtaining diagnostic data related to one or more client sessions;

identifying at least one cause of the change in the overall score based on client session, diagnostic data, identified performance metrics, and the at least one aspect of the digital service;

changing an aspect of a subscription to the digital service associated with a user of the device associated with one or more client sessions;

causing an entity to change an aspect of the digital service, one or more client sessions, or one or more devices, by transmitting an indication of diagnostic data related to the client session to an entity associated with an aspect of the digital service; and causing an entity to change an aspect of the digital service, client session, or device, by transmitting an indication of at least one cause of the change in the overall score to an entity associated with an aspect of the digital service; and cause the digital service to be improved by causing the change to the aspect of the digital service, one or more client sessions, or one or more devices to be made by taking the action.

16. The system of claim 15, wherein to determine the action, the computer-executable instructions further cause the system to:

identify at least one aspect of the digital service based on the client session that caused the greatest change in the overall score;

determine the action based on the identified at least one aspect of the digital service.

17. The system of claim 16, wherein the action comprises one or more of:

obtaining diagnostic information from one or more devices to which a client session was provided;

causing the at least one aspect of the digital service to be changed; and changing one or more subscriptions associated with one or more client sessions of the plurality of client sessions.

18. The system of claim 16, wherein to identify one or more client sessions, the computer-executable instructions further cause the system to:

for each respective client session of the plurality of client sessions:

identify a plurality of performance metrics for measuring an overall score of the respective client session;

identify one or more performance metrics of the plurality of performance metrics that had a greater impact on the overall score of the respective client session than other performance metrics of the plurality of performance metrics; and identify the one or more client sessions based on the identified one or more performance metrics for each client session and at least one determined weight for each client session.

19. The system of claim 16, wherein to determine the action, the computer-executable instructions further cause the system to:

receive a plurality of overall scores for digital services other than the digital service;

identify at least one cause of the change in the overall score of the service based on a comparison of the overall score for the digital service to the plurality of overall scores and the at least one aspect of the digital service; and determine the action based on the at least one aspect of the digital service and the cause of the change in the overall score of the digital service.

20. The system of claim 16, wherein to determine the action, the computer-executable instructions further cause the system to:

for each respective client session of the identified one or more client sessions:

receive information regarding the performance of the client session from a user of a device associated with the respective client session; and determine the action based on the at least one aspect of the digital service and the information received for each of the identified one or more client sessions.

* * * * *